United States Patent
Yee et al.

[11] Patent Number: 5,958,096
[45] Date of Patent: Sep. 28, 1999

[54] AIR FILTER FOR VEHICLE

[76] Inventors: Clinton C. Yee, 5235 Fiore Ter., Apt. C402, San Diego, Calif. 92122; Benjie P. Lapid, 4079 Tim St., Bonita, Calif. 91902

[21] Appl. No.: 09/183,433

[22] Filed: Oct. 30, 1998

[51] Int. Cl.⁶ .................................................. B01D 50/00
[52] U.S. Cl. ............................. 55/385.3; 55/517; 55/519; 55/529; 55/DIG. 28
[58] Field of Search .................................. 55/304, 385.3, 55/529, 517, 519, DIG. 28

[56] References Cited

U.S. PATENT DOCUMENTS

| | | |
|---|---|---|
| 1,639,170 | 8/1927 | Fell . |
| 3,385,039 | 5/1968 | Burke et al. . |
| 3,486,626 | 12/1969 | Close . |
| 3,698,161 | 10/1972 | Brixius et al. . |
| 3,950,157 | 4/1976 | Matney . |
| 4,211,543 | 7/1980 | Tokar et al. . |
| 4,588,426 | 5/1986 | Virgille et al. . |
| 4,657,570 | 4/1987 | Gronholz et al. . |
| 4,878,930 | 11/1989 | Manniso et al. . |
| 5,100,443 | 3/1992 | Berto . |
| 5,100,551 | 3/1992 | Pall et al. . |
| 5,133,315 | 7/1992 | Reese . |
| 5,350,444 | 9/1994 | Gould et al. . |
| 5,573,811 | 11/1996 | Townsley . |
| 5,681,363 | 10/1997 | Tucker et al. .............................. 55/304 |
| 5,685,894 | 11/1997 | Bowerman et al. . |

*Primary Examiner*—Jay H. Woo
*Assistant Examiner*—Minh-Chau T. Pham
*Attorney, Agent, or Firm*—John L. Rogitz

[57] ABSTRACT

An air filter for a vehicle engine includes an outer frame having ribs and an inner frame nested within the outer frame, the inner frame having air redirecting baffles. The outer frame includes a central downwardly-depending finned support that extends between the baffles of the inner frame, and a non-inverted portion of a filter element is held between the baffles and ribs, while an inverted portion of the filter element is held taut between the finned support and the baffles. The presence of both an inverted and non-inverted portion of the filter element, as well as the multi-fluted configuration of the filter that is established by the cooperation of the ribs and baffles, optimizes the air filtration surface of the filter. The filter element is pinched between a bottom flange of the outer frame and a groove on the base of the inner frame that receives the bottom flange therein. With this structure, a filter element characterized by, e.g., high porosity and a correspondingly low resistance to air flow can be installed when relatively high prolonged engine speeds are expected during, e.g., racing, and, when lower or variable engine speeds are expected, e.g., for city driving, the frames can be easily separated and the filter element replaced with a low porosity, high resistance element that is more appropriate for such engine speeds.

20 Claims, 2 Drawing Sheets

AIR FILTER FOR VEHICLE

FIELD OF THE INVENTION

The present invention relates generally to air filters, and more particularly to air filters for vehicle engines.

BACKGROUND

As is well known, internal combustion engines work by mixing fuel with air and combusting the mixture in one or more engine cylinders to reciprocate pistons in the cylinders, with the pistons in turn being coupled to the crankshaft of the engine to turn the crankshaft and, thus, to output power. As is also well known, to increase engine efficiency and to prolong engine life, dust, particles, and other particulate should be filtered out of the air, prior to combustion. Accordingly, most vehicles are equipped with the familiar vehicle engine air filter, which includes a hollow housing that holds a filter element. Air from the engine compartment is directed through an air inlet plenum into the housing, inwardly through the filter element, and out of an outlet plenum. The filtered air is then mixed with gasoline either in a carburetor or in the cylinders of the engine.

Not surprisingly, many air filters for vehicle engines have been introduced. For example, U.S. Pat. No. 4,211,543 discloses an elongated replaceable paper filter element that fits into a urethane outer liner. An inner liner is nested in a safety sleeve, and the safety sleeve in turn is received within the filter element. The filter disclosed in the '543 patent is intended primarily for truck engines, however, and is not necessarily optimized for the engines of other types of vehicles. Specifically, the present invention recognizes that owing to its evident lack of non-filtering structure external to the filtering media, the '543 patent does not facilitate the directing of air into the filter beyond simply allowing the air to enter the filter. Also, the internal structure of the '543 patent does not appear to be designed with the purpose of effectively redirecting and smoothing air flow within the filter.

U.S. Pat. No. 3,385,039, on the other hand, discloses an air filter for non-vehicular ventilation systems which includes an outer grid shaped like a rectangular pyramid, with the upper, smaller portion of the pyramidal grid being inverted with respect to the lower, larger portion. A complementarily-configured inner grid nests within the outer grid, and a filter medium is held between the grids. The '039 patent, however, is not intended for vehicle use, and consequently the '039 patent envisions air flow proceeding from inside the grid to outside the grid, not vice-versa. Perhaps not surprisingly, therefore, the '039 structure is not optimized for redirecting and smoothing air flow within its grids, nor is it optimized for directing air flow outside its grids to flow inwardly, since the air flow in the '039 patent is outward. As recognized by the present invention, in a vehicle air filter in which air flows inwardly to the center of the filter, it is desirable to smooth and redirect air within the filter as the air passes to the outlet plenum of the filter.

Additionally, the '039 filter, while seeking to optimize air filtration surface area by its structure, uses two (an inner inverted set and an outer set) sets of four flat walls each, owing to the generally pyramidal structure of the filter. As recognized herein, however, it is possible to further increase the air filtration surface of a vehicle air filter beyond what is envisioned in the '039 patent. Moreover, the '039 filter requires locks to hold the grids together, and a seal to hold the filter medium between the grids, undesirably complicating the structure of the '039 filter.

Other structural shortcomings exist in prior art filters. For example, we understand that polyurethane foam filters are effective, but existing filters that use polyurethane as the filtering medium use highly restrictive metal meshes to keep their foams securely in place. This impedes air flow into the filters and thus is undesirable.

In addition to the above considerations, we have discovered that engine performance at higher speeds and power is better optimized using air filters having relatively high porosity and, thus, relatively low resistances to air flow, whereas engine performance at lower speeds is better optimized using air filters having relatively low porosity and, thus, relatively high resistances to air flow. We think this is because the resonance of the air intake system of an engine is better tuned to the resonance of the engine RPM (thereby increasing air pressure at the cylinder and thus boosting power at the target RPM) by establishing air filter resistances as summarized above. Unfortunately, standard vehicle engine air filters typically do not envision or provide for selecting more than a single, "one size fits all" filter element type for any particular vehicle model.

Accordingly, it is an object of the present invention to provide an improved vehicle engine air filter.

SUMMARY OF THE INVENTION

An air filter for an engine having an air intake includes an outer frame that has plural ribs and a bottom flange, and an inner frame that has more than four vertical baffles and a groove configured complementarily to the bottom flange. As intended herein, the inner frame has a filtered air outlet plenum that can be engaged with the air intake of the engine, with the inner frame being nestably received within the outer frame. A filter element is held taut between the frames by cooperation of the ribs with the baffles. Also, a portion of the filter element is trapped between the bottom flange of the outer frame and the groove of the inner frame to hold the filter element. With this structure, when the filter is engaged with the engine with the outlet plenum in communication with the air intake of the engine, air flows through the outer frame and is directed by the ribs into the filter element. When this happens, the filter element traps particles and passes air to the plenum, with the baffles redirecting and smoothing the air as it passes into the plenum. Advantageously, with the above-disclosed structure a restrictive metal mesh is not required to keep the filter element in place.

Preferably, the filter element includes an outer foam mesh for trapping large particles and an inner polyurethane foam for trapping small particles. As disclosed in detail below, the ribs and baffles cooperate to cause the filter element to assume a configuration that includes flutes separated by ridges for optimizing air filtration surface area. A respective filter wall is defined between each adjacent ridge and flute, and successive filter walls are not orthogonal to each other.

In the presently preferred embodiment, the inner and outer frames define respective inner and outer continuous bases, and the baffles and ribs rise upwardly from the inner and outer bases, respectively. The ribs of the outer frame terminate in the longitudinal dimension at an upper surface, and the baffles of the inner frame terminate in the radial dimension at generally vertical inner edges. Additionally, the outer frame includes a support that depends downwardly from the upper surface at least partially between the inner edges of the baffles for optimizing air filtration of the filter element by establishing a non-inverted portion of the filter element having an upwardly tapered configuration and an inverted portion of the filter element having a downwardly tapered configuration. The inverted portion of the filter element is coaxially disposed in the non-inverted portion. Also, the preferred support is finned in transverse cross-section and is tapered in longitudinal cross-section.

In another aspect, a vehicle air filter includes an outer support frame and an inner support frame nested in the outer support frame. A filter element is held between the frames owing to the cooperation of the frames, with the filter element being configured for filtering air passing inwardly through the filter element.

In another aspect, a method for establishing, in a combustion air system of an engine of a vehicle, a fluid flow resistance in the air system based on a target engine speed includes providing a filter element characterized by a first resistance. In accordance with the present invention, the first resistance is established based on the target engine speed. Further, the method includes providing a filter holder that can be manipulated to selectively hold the filter element and to selectively release the filter element for replacing the filter element with a replacement filter element. This replacement filter element can be characterized by a second resistance that is different from the first resistance for optimizing engine performance when the engine is operated at a second speed different from the target speed, it being understood that the second resistance is established based on the second speed.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
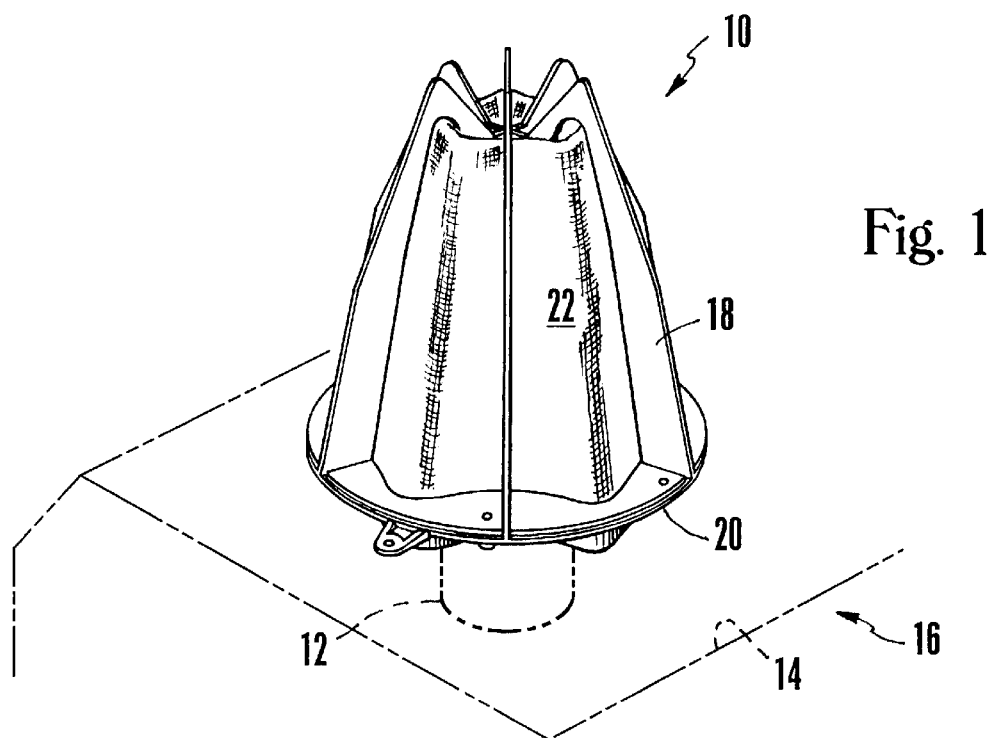
FIG. 1 is a perspective view of the present air filter, shown in an exploded relationship with the air intake of a vehicle engine.
Figure 2:
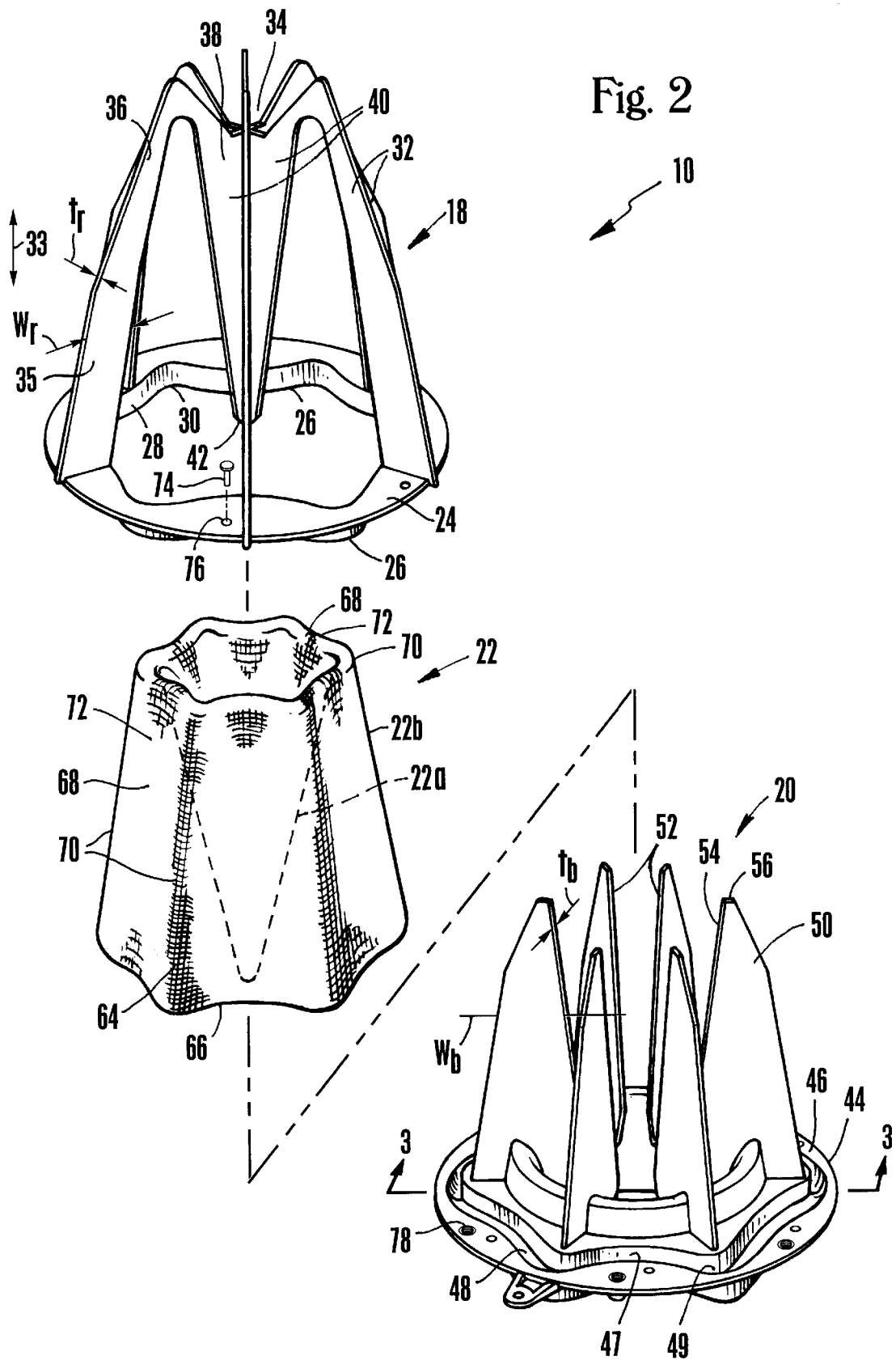
FIG. 2 is an exploded perspective view of the air filter.

Now referring to FIGS. 1 and 2, an air filter, generally designated 10, is shown for filtering particulates from air prior to the air entering an air intake 12 of an engine 14 of a vehicle, generally designated 16. To this end, the filter 10 is engaged with the air intake 12 as more fully described below.

As shown best in FIG. 2, the air filter 10 includes a metal or plastic unitary outer frame 18 and a metal or plastic unitary inner frame 20 that is selectively nested within the outer frame 18, with a filter element 22 being held between the frames 18, 20. The outer frame 18 includes a continuous ring-like continuous base 24 having a bottom flange 26 depending downwardly therefrom. As shown, the bottom flange 26 is contoured to form (preferably six) flute segments 28 that alternate with rib segments 30.

Plural, six in the preferred embodiment, ribs 32 are made integrally with the base 24 of the outer frame and the ribs 32 rise upwardly from the base 24 to terminate at an upper surface 34. As shown, each rib 32 is generally elongated in the vertical dimension indicated by the arrows 33. According to the preferred embodiment, each rib 32 includes a respective lower segment 35 that slopes inwardly a little toward the top surface 34 and, about midway up the rib 32, a respective dogleg 36 joins the lower segment 35 to the upper surface 34. The dogleg 36 of each rib 32 slopes radially inwardly even more than does the associated lower segment 35. Also, in the radial dimension of the air filter 10 each rib 32 defines an upwardly tapering width "$W_r$", and a thickness "$t_r$" is defined by each rib 32 in the dimension orthogonal to the radial dimension and parallel to the base 24 as shown. In the particularly preferred embodiment shown, the thickness "$t_r$" of a rib 32 is smaller than the width "$W_r$" of the rib 32.

In the preferred embodiment, a support 38 depends downwardly from the upper surface 34. As shown, the support 38 is finned in transverse cross-section and is tapered in longitudinal cross-section. Preferably, the support 38 has six right triangular fins 40 joined along their long legs, such that the hypotenuses of opposed fins 40 give the support 38 a profile somewhat like an inverted isosceles triangle. The apex 42 of the support 38 extends down nearly to the plane of the base 24.

Turning to the inner frame 20, a continuous ring-like base 44 of the inner frame 20 defines an upper surface 46, and a groove 48 is formed in the upper surface 46 and is complementarily configured to the bottom flange 26 of the outer frame 18. Accordingly, the groove 48 forms flute segments 47 and rib segments 49. The width of the groove 48 is such that when the filter element 22 is disposed between the frames 18, 20 with a portion of the filter element 22 trapped between the bottom flange 26 of the outer frame 18 and the groove 48, the bottom flange 26 is closely received in the groove 48 in an interference fit.

The inner frame 20 includes a plurality of, preferably six, elongated plate-like baffles 50 that rise upwardly from the base 44 of the inner frame 20. As shown in FIG. 2, each baffle 50 is radially aligned with a respective rib segment 49 of the groove 48. In the radial dimension of the air filter 10, each baffle 50 defines an upwardly tapering width "$W_b$", and a thickness "$t_b$" is defined by each baffle in the dimension orthogonal to the radial dimension and parallel to the base 44 as shown. In the particularly preferred embodiment shown, the thickness "$t_b$" of a baffle 50 is smaller than the width "$W_b$" of the baffle 50.

Figure 3:
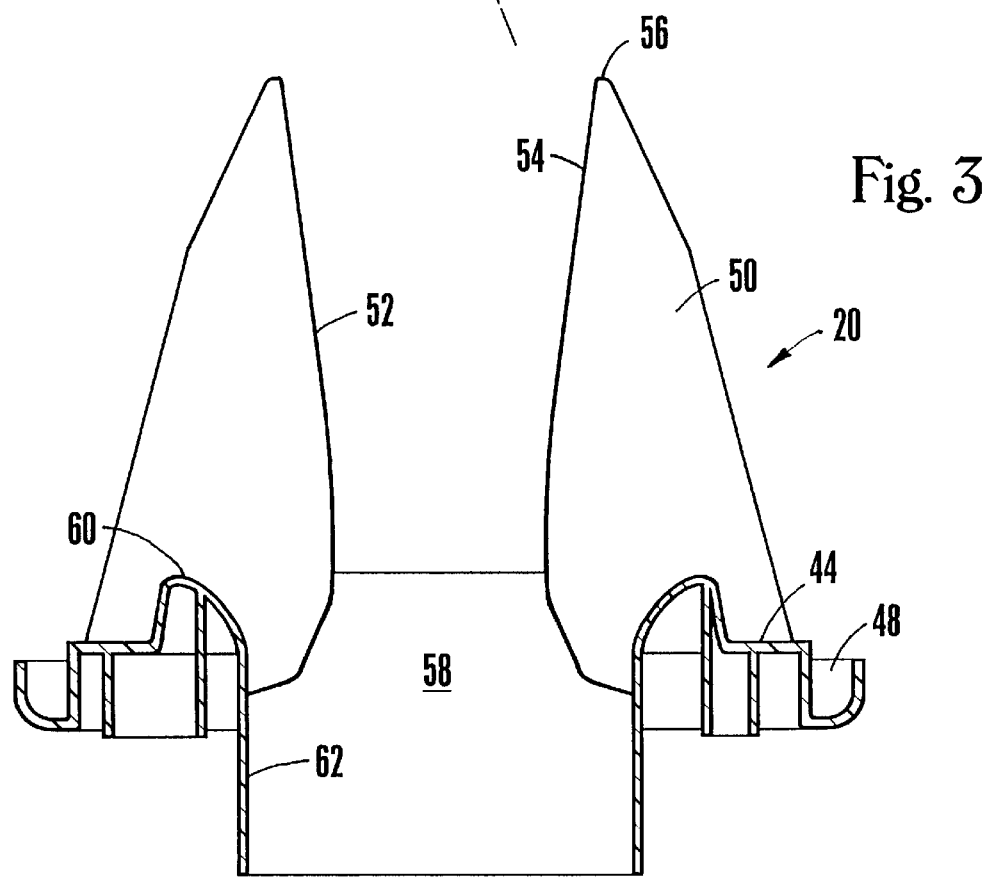
FIG. 3 is a cross-sectional view as seen along the line 3–3 in FIG. 2.

FIGS. 2 and 3 show that the profiles of the baffles 50 are generally triangular, with the baffles 50 terminating at respective inner edges 52. Per the embodiment shown in FIGS. 2 and 3, the edges 52 are generally vertical, with an upper segment 54 of each edge 52 sloping slightly radially outwardly as it rises toward the top end 56 of the respective baffle 50. When the frames 18, 20 are engaged with each other as shown in FIG. 1, the support 38 of the outer frame 18 is disposed at least partially between the inner edges 52 of the baffles 50 of the inner frame 20, with the baffles 50 of the inner frame 20 being staggered with respect to the ribs 32 of the outer frame 18.

In addition to the baffles 50, FIG. 3 best shows that the base 44 of the inner frame 20 is made integrally with a generally cylindrical filtered air outlet plenum 58 which is centered around the axis of the air filter 10 as shown. In one preferred embodiment the plenum 58 includes a curb 60 that rises upwardly on the base 44 of the inner frame 20 and then doubles back downwardly to define a longitudinally annular air passage wall 62 that depends downwardly from the base 44 of the inner frame 20. As intended by the present invention, the air passage wall 62 is fitted onto the air intake 12 of the engine 14 in an interference fit, with the plenum 58 in communication with the engine 14.

In accordance with the preferred embodiment shown in FIG. 2, the preferred filter element 22 includes an outer foam mesh 64 for trapping large particles. In one embodiment, the outer mesh 64 has a porosity of 6–12 ppi. The outer mesh 64 covers an inner foam layer 66 that traps small particles and that has been treated with a "tackifier" substance to further this purpose. The above-disclosed structure is one way to configure the filter element 22 for filtering air passing inwardly through the filter element 22, but it is to be understood that other methods can be used.

When high engine 14 speeds are anticipated, as might happen during racing, a relatively less restrictive, more porous inner foam layer 66, e.g., ten pores per inch (10 ppi) urethane, is used to attain higher top speeds than would otherwise be attainable with more restrictive filters. On the other hand, when low or variable engine 14 speeds are anticipated, as might happen during stop and go driving, a relatively more restrictive, less porous inner foam layer 66, e.g., in a range of sixty to one hundred twenty pores per inch (60 ppi–120 ppi) urethane, and more preferably one hundred pores per inch (100 ppi) urethane, is used to improve acceleration from a stop as compared to accelerations that would otherwise be attained with less restrictive air filters.

The filter element 22 can be made from a single piece of two-ply flexible material and then configured as a cone. Then, the filter element 22 is positioned base first over the baffles 50 of the inner frame 20. The outer frame 18 is then lowered onto the inner frame 20 to pinch a portion of the filter element 22 between the bottom flange 26 of the outer frame 18 and the groove 48 of the inner frame 20, with the frames 18, 20 then being engaged therealong as set forth above.

As the outer frame 18 is lowered onto the inner frame 20 with filter element 22, the support 38 of the outer frame 18 pushes down against the filter element 22 such that an upper portion 22a (shown in phantom in FIG. 2) of the filter element 22 becomes inverted with respect to a lower portion 22b of the filter element 22. In other words, a non-inverted portion 22b of the filter element 22 has an upwardly tapered configuration, and an inverted portion 22a of the filter element 22 has a downwardly tapered configuration, with the inverted portion being coaxially disposed in the non-inverted portion.

It can now be appreciated in reference to FIGS. 1 and 2 that the baffles 50 of the inner frame 20 cooperate with the ribs 32 and support 38 of the outer frame 18 to hold the inverted portion 22a of the filter element 22 taut between the inner edges 52 of the baffles 50. Likewise, the ribs 32 cooperate with the baffles 50 to hold the non-inverted portion 22b of the filter element 22 taut therebetween.

Furthermore, the cooperation between the ribs 32, support 38, and baffles 50 render the filter element 22 configuration seen in FIG. 2, namely, a configuration in which flutes 68 are separated by ridges 70. Respective filter walls 72 are defined between each ridge 70 and the immediately adjacent flutes 68, and in the preferred embodiment successive filter walls 72 are not orthogonal to each other, because the disclosed number of baffles 50 results in six ridges 70 and, hence, six flutes 68 and twelve walls 72.

FIG. 2 best shows that threaded fasteners 74 (only one shown in FIG. 2) can pass through holes 76 in one of the bases 24, 44 of the frames 18, 20 and engage threaded bosses 78 that are disposed in holes in the other base 44, 24 to further selectively hold the frames 18, 20 together.

With the structure of the air filter 10 in mind, in operation air flows radially inwardly through the outer frame 18 and is directed by the ribs 32 into the filter element 22. The filter element 22 traps particles and passes air inwardly to the filter air outlet plenum 58. In accordance with the present invention, the baffles 50 redirect and smooth air as it passes into the plenum 58 and from there into the air intake 12 of the engine 14. The fluted, partially inverted configuration of the filter element 22 optimizes air filtration surface area as compared to the filters provided by the above-disclosed prior art patents.

Moreover, as discussed above the porosity and, hence, resistance of air flow of the filter element 22 can be selected based on the anticipated desired performance of the engine 14. Accordingly, when a low porosity, high resistance filter element 22 (with, e.g., a 100 ppi foam layer 66) has been installed between the frames 18, 20 for city driving, and it is subsequently desired to drive on a high speed journey (e.g., for racing), the frames 18, 20 can be separated by disengaging the fasteners 74 from the bosses 78 and pulling the frames apart, and the filter element 22 then removed and replaced with a new, high porosity, low resistance filter element (having, e.g., an inner foam layer of 10 ppi) that is in all essential respects identical in configuration to the filter element 22. The frames 18, 20 are then snapped back together to trap the new filter element between the bottom flange 26 of the outer frame 18 and the groove 48 of the inner frame 20 as disclosed above, and the fasteners 74 reengaged with the bosses 78.

While the particular AIR FILTER FOR VEHICLE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims.

What is claimed is:

1. An air filter for an engine having an air intake, comprising:

an outer frame having plural ribs and a bottom flange;

an inner frame having plural vertical baffles and a groove configured complementarily to the bottom flange, the inner frame being engageable with the air intake of the engine and having a filtered air outlet plenum, the inner frame being nestably received within the outer frame; and a filter element held between the frames by cooperation of the ribs with the baffles, a portion of the filter element being trapped between the bottom flange of the outer frame and the groove of the inner frame, whereby when the filter is engaged with the engine with the filtered air outlet plenum in communication with the air intake of the engine, air flows through the outer frame and is directed by the ribs into the filter element, the filter element trapping particles and passing air to the plenum, the baffles redirecting and smoothing air into the plenum.

2. The air filter of claim 1, wherein the filter element includes an outer foam mesh for trapping large particles and an inner foam for trapping small particles.

3. The air filter of claim 1, wherein the ribs and baffles cooperate to cause the filter element to define flutes separated by ridges for optimizing air filtration surface area.

4. The air filter of claim 3, wherein a respective filter wall is defined between adjacent ridges and flutes, and successive filter walls are not orthogonal to each other.

5. The air filter of claim 1, wherein the inner and outer frames define respective inner and outer continuous bases, and the baffles and ribs rise upwardly from the inner and outer bases, respectively.

6. The air filter of claim 1, wherein the ribs of the outer frame terminate at an upper surface, the baffles of the inner frame terminate at generally vertical inner edges, and the outer frame further comprises a support depending downwardly from the upper surface at least partially between the inner edges of the baffles for optimizing air filtration by the filter element by establishing a non-inverted portion of the filter element having an upwardly tapered configuration and establishing an inverted portion of the filter element having downwardly tapered configuration, the inverted portion being coaxially disposed in the non-inverted portion.

7. The air filter of claim 6, wherein the support is finned in transverse cross-section and tapered in longitudinal cross-section.

8. A vehicle air filter, comprising:

an outer support frame;

an inner support frame nested in the outer support frame; and a filter element held between the frames owing to the cooperation of the frames, the filter element being configured for filtering air passing inwardly through the filter element.

9. The vehicle air filter of claim 8, wherein the filter element includes an outer mesh for deflecting and thereby preventing large particles from entering the filter element and an inner foam for trapping small particles in air after the air has passed through the mesh.

10. The vehicle air filter of claim 8, wherein the outer frame has plural ribs and a bottom flange, and the inner frame has plural vertical baffles and a groove configured complementarily to the bottom flange, the inner frame being engageable with an air intake of an engine of the vehicle and having a filtered air outlet plenum.

11. The vehicle air filter of claim 10, wherein a portion of the filter element is trapped between the bottom flange of the outer frame and the groove of the inner frame, whereby when the filter is engaged with the engine with the filtered air outlet plenum in communication with the air intake of the engine, air flows through the outer frame and is directed by the ribs into the filter element, the filter element trapping particles and passing air to the plenum, the baffles redirecting and smoothing air into the plenum.

12. The vehicle air filter of claim 10, wherein the ribs and baffles cooperate to cause the filter element to define flutes separated by ridges for optimizing air filtration surface area.

13. The air filter of claim 12, wherein a respective filter wall is defined between adjacent ridges and flutes, and successive filter walls are not orthogonal to each other.

14. The vehicle air filter of claim 10, wherein the inner and outer frames define respective inner and outer continuous bases, and the baffles and ribs rise upwardly from the inner and outer bases, respectively.

15. The vehicle air filter of claim 10, wherein the ribs of the outer frame terminate at an upper surface, the baffles of the inner frame terminate at generally vertical inner edges, and the outer frame further comprises a support depending downwardly from the upper surface at least partially between the inner edges of the baffles for optimizing air filtration surface area of the filter element by establishing a non-inverted portion of the filter element having an upwardly tapered configuration and establishing an inverted portion of the filter element having downwardly tapered configuration, the inverted portion being coaxially disposed in the non-inverted portion.

16. The vehicle air filter of claim 15, wherein the support is finned in transverse cross-section and tapered in longitudinal cross-section.

17. A method for establishing, in a combustion air system of an engine of a vehicle, a fluid flow resistance in the air system based on a target engine speed, comprising:

providing a filter element having a first resistance, the first resistance being established based on the target engine speed;

providing a filter holder manipulable to selectively hold the filter element and to selectively release the filter element for replacing the filter element with a replacement filter element having a second resistance different from the first resistance for optimizing engine performance when the engine is operated at a second speed different from the target speed, the second resistance being established based on the second speed.

18. The method of claim 17, wherein the filter holder includes:

an outer frame having plural ribs and a bottom flange; and an inner frame having plural vertical baffles and a groove configured complementarily to the bottom flange, the inner frame being engageable with an air intake of the engine and having a filtered air outlet plenum, the inner frame being nestably received within the outer frame, the filter element being held between the frames by cooperation of the ribs with the baffles, a portion of the filter element being trapped between the bottom flange of the outer frame and the groove of the inner frame, whereby when the filter is engaged with the engine with the filtered air outlet plenum in communication with the air intake of the engine, air flows through the outer frame and is directed by the ribs into the filter element, the filter element trapping particles and passing air to the plenum, the baffles redirecting and smoothing air into the plenum.

19. The method of claim 18, wherein the ribs of the outer frame terminate at an upper surface, the baffles of the inner frame terminate at generally vertical inner edges, and the outer frame further comprises a support depending downwardly from the upper surface at least partially between the inner edges of the baffles for optimizing air filtration of the filter element by establishing a non-inverted portion of the filter element having an upwardly tapered configuration and establishing an inverted portion of the filter element having downwardly tapered configuration, the inverted portion being coaxially disposed in the non-inverted portion.

20. The method of claim 19, wherein the support is finned in transverse cross-section and tapered in longitudinal cross-section.

* * * * *